United States Patent
Hofmann et al.

(10) Patent No.: US 8,200,848 B2
(45) Date of Patent: Jun. 12, 2012

(54) METHOD AND APPARATUS FOR FACILITATING COMMUNICATION BETWEEN A MANAGED SYSTEM AND MANAGEMENT SYSTEMS

(75) Inventors: Stefan Hofmann, Schnaittach (DE); Peter Rauch, Eckental (DE); Tobias Tretter, Nürnberg (DE)

(73) Assignee: Alcatel Lucent, Paris (FR)

( * ) Notice: Subject to any disclaimer, the term of this patent is extended or adjusted under 35 U.S.C. 154(b) by 1293 days.

(21) Appl. No.: 11/563,960

(22) Filed: Nov. 28, 2006

(65) Prior Publication Data

US 2008/0126524 A1 May 29, 2008

(51) Int. Cl.
*G06F 15/173* (2006.01)
(52) U.S. Cl. .................................... 709/250; 709/246
(58) Field of Classification Search .................. 709/250, 709/246
See application file for complete search history.

(56) References Cited

U.S. PATENT DOCUMENTS

| | | | |
|---|---|---|---|
| 5,961,595 A * | 10/1999 | Kawagoe et al. ............. 709/223 |
| 6,052,371 A | 4/2000 | Lemieux |
| 6,182,157 B1 | 1/2001 | Schlener et al. |
| 6,260,062 B1 | 7/2001 | Davis et al. |
| 6,425,005 B1 | 7/2002 | Dugan et al. |
| 6,480,901 B1 | 11/2002 | Weber et al. |
| 6,529,953 B1 | 3/2003 | Van Renesse |
| 6,708,207 B1 * | 3/2004 | Sabelhaus et al. ............. 709/223 |
| 6,968,371 B1 * | 11/2005 | Srinivasan .................... 709/223 |
| 6,976,262 B1 * | 12/2005 | Davis et al. .................. 719/328 |
| 7,039,724 B1 | 5/2006 | Lavian et al. |
| 7,085,851 B2 * | 8/2006 | Nusbickel et al. ............ 709/246 |
| 7,143,156 B2 * | 11/2006 | Menzies et al. ............... 709/223 |
| 7,389,337 B2 * | 6/2008 | Croy et al. .................... 709/223 |
| 7,516,191 B2 * | 4/2009 | Brouk et al. .................. 709/217 |
| 7,783,733 B1 * | 8/2010 | Yip et al. ...................... 709/223 |
| 2003/0208574 A1 | 11/2003 | Chen et al. |
| 2007/0130326 A1 | 6/2007 | Raphael et al. |

OTHER PUBLICATIONS

F. Stamatelopoulos, et al., "A Scaleable, Platform-Based Architecture for Multiple Domain Network Management," Communications, 1995. ICC '95 Seattle, 'Gateway to Globalization,' 1995 IEEE International Conference on, vol. 3, pp. 1453-1458, Jun. 18-22, 1995.

* cited by examiner

*Primary Examiner* — Kevin Bates
(74) *Attorney, Agent, or Firm* — Wall & Tong, LLP (57) ABSTRACT

The invention includes method and apparatus for generating a protocol agent adapted to facilitate communications between a managed system and at least one management system. The method includes generating an implementation of a unified information model from an information model specification and generating the protocol agent from a protocol specification. The protocol specification includes first mappings to the information model specification and the protocol agent includes second mappings to the implementation of the unified information model. The second mappings are formed using the first mappings. The information model specification includes a model of hardware of the managed system. The implementation of the unified information model includes a plurality of logical entities, wherein the logical entities represent a plurality of physical entities of the managed system. The protocol specification includes a model of a protocol. The protocol agent includes a plurality of protocol entities.

20 Claims, 9 Drawing Sheets

METHOD AND APPARATUS FOR FACILITATING COMMUNICATION BETWEEN A MANAGED SYSTEM AND MANAGEMENT SYSTEMS

CROSS-REFERENCE TO RELATED APPLICATION

The present patent application is related to commonly assigned and concurrently filed patent application Ser. No. 11/563,897, filed Nov. 28, 2006, entitled "Method and Apparatus for Facilitating Communication Between a Managed System and a Management System," which is hereby incorporated by reference in its entirety.

FIELD OF THE INVENTION

The invention relates to the field of communication networks and, more specifically, to multi-protocol communication networks.

BACKGROUND OF THE INVENTION

A communication system typically needs to be managed by multiple management systems which often use different management protocols in order to communicate with the communication system (often referred to as a multi-protocol environment). The management protocols are used to manage the entities of which the communication system is composed. Each management protocol has a specific, inherent information model that arranges the entities of which the communication system is composed. The information models of respective management protocols differ, often significantly, for different management protocols (i.e., hierarchy and granularity of managed entities may differ significantly).

Existing communications systems employing multi-protocol frameworks typically use an internal representation that is based upon an information model (commonly referred to as a Management Information Base (MIB)) that is compatible with Simple Network Management Protocol (SNMP). Such SNMP-compatible information models are typically defined by standardization bodies. Disadvantageously, however, such an SNMP-compatible information model typically cannot fully match the internal architecture of the associated communication system. Furthermore, such an SNMP-compatible information model enforces a common information model for all management protocols used by the management system, regardless of whether or not all of the management protocols are compatible with or can easily be adapted to the SNMP-compatible information model.

SUMMARY OF THE INVENTION

Various deficiencies in the prior art are addressed through the invention of a method and apparatus for generating a protocol agent adapted to facilitate communications between a managed system and at least one management system. The method includes generating an implementation of a unified information model from an information model specification and generating the protocol agent from a protocol specification. The protocol specification includes first mappings to the information model specification and the protocol agent includes second mappings to the implementation of the unified information model. The second mappings are formed using the first mappings. The first mappings include reference mappings and the second mappings include use mappings. The information model specification includes a model of hardware of the managed system. The implementation of the unified information model includes a plurality of logical entities, wherein the logical entities represent a plurality of physical entities of the managed system. The protocol specification includes a model of a protocol. The protocol agent includes a plurality of protocol entities.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention generates one or more protocol agents for a managed system, where the one or more protocol agents are adapted for facilitating communications with one or more management systems using one or more protocols. As described herein, protocol agents generated using the present invention may be used to facilitate communications between the one or more management systems and physical system entities of the managed system (or, optionally, with a management layer including logical system entities associated with the physical system entities of the managed system). The protocol agents generated using the present invention support both downstream and upstream communications between the managed system and one or more management systems.

Figure 1:
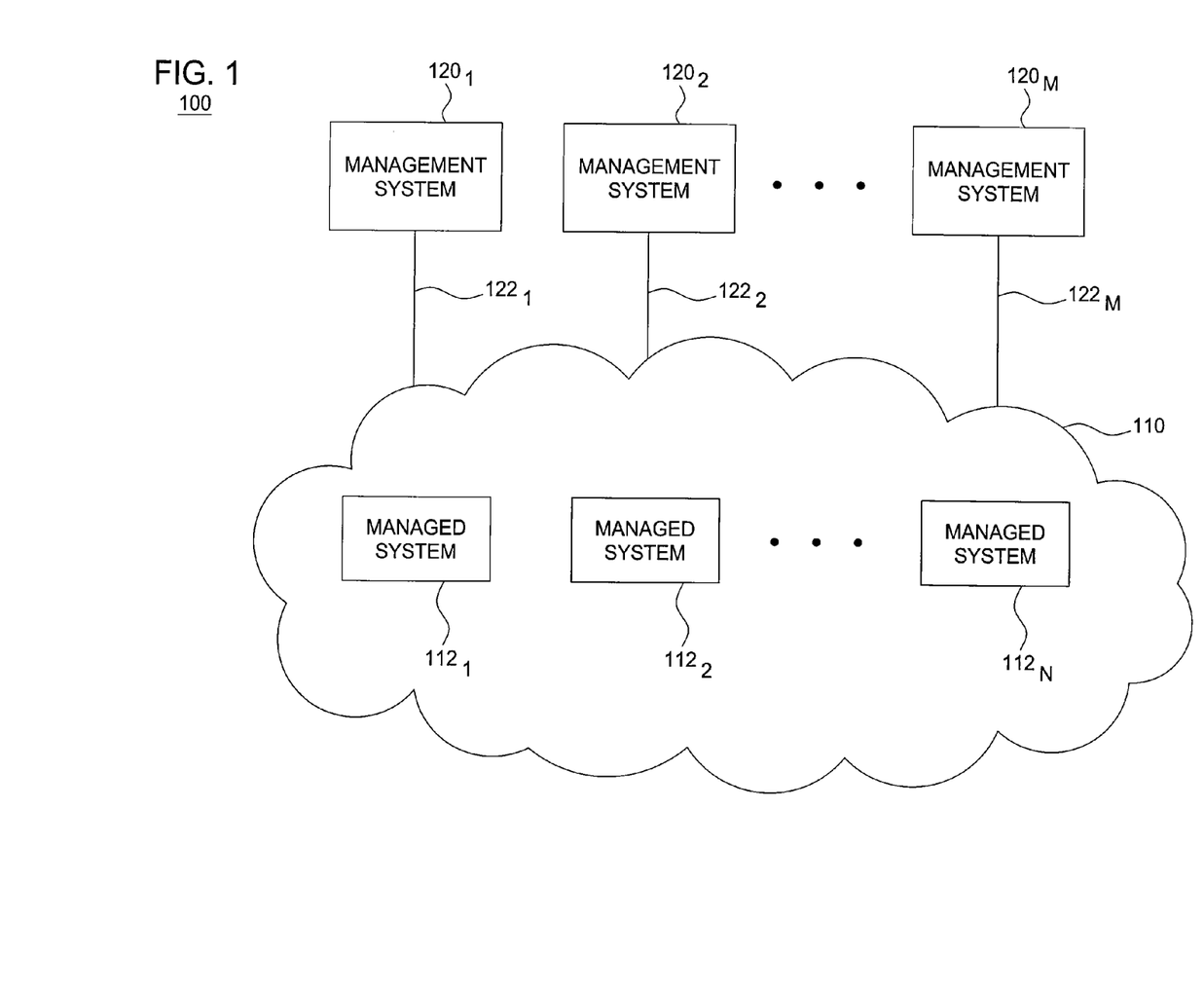
FIG. 1 depicts a high-level block diagram of a communication network.

FIG. 1 depicts a high-level block diagram of a communication network. Specifically, communication network 100 of FIG. 1 includes a communication network 110 and a plurality of management systems $120_1$-$120_M$ (collectively, management systems 120). The communication network 110 includes a plurality of managed systems $112_1$-$112_N$ (collectively, managed systems 112). The management systems $120_1$-$120_M$ communicate with communication network 110 using a respective plurality of communication paths $122_1$-$122_M$ (collectively, communication paths 122). The management systems 120 include systems operable for managing managed systems 112.

The managed systems 112 may include network elements supporting various different communication networks, such as Synchronous Optical Networks (SONET), Synchronous Digital Hierarchy (SDH) networks, Optical Transport Networks (OTNs), Internet Protocol (IP) networks, Asynchronous Transfer Mode (ATM) networks, wireless networks, and the like, as well as various combinations thereof. For example, depending on the type of communication network in which the managed systems 112 operate, managed systems 112 may include switches, routers, add-drop multiplexers, gateway devices, mobile switching centers, inter-working functions, and the like, as well as various combinations thereof.

The management systems 120 may include various communications management systems adapted for managing managed systems 112. For example, depending on the type of communication network in which the managed systems 112 operate, management systems 120 may include systems such as inventory management systems, provisioning management systems, fault management systems, performance monitoring systems, and the like, as well as various combinations thereof. The management systems 120 may communicate with managed systems 112 using various different management protocols such as Simple Network Management Protocol (SNMP), Common Management Information Protocol (CMIP), Transaction Language 1 (TL1), Common Object Request Broker Architecture (CORBA) protocol, and the like, as well as various combinations thereof.

Although primarily depicted and described herein with respect to a telecommunication network including telecommunication systems managed by telecommunication management systems, the present invention may be used in various other networks including management systems and managed systems. For example, the present invention may be used in factory networks including various controllers in communication with equipment for managing the equipment, embedded systems, and like applications, as well as various combinations thereof. Furthermore, the present invention may be used to manage one or more managed devices that do not form part of a network. In other words, the present invention is not limited to telecommunications networks.

Figure 2:
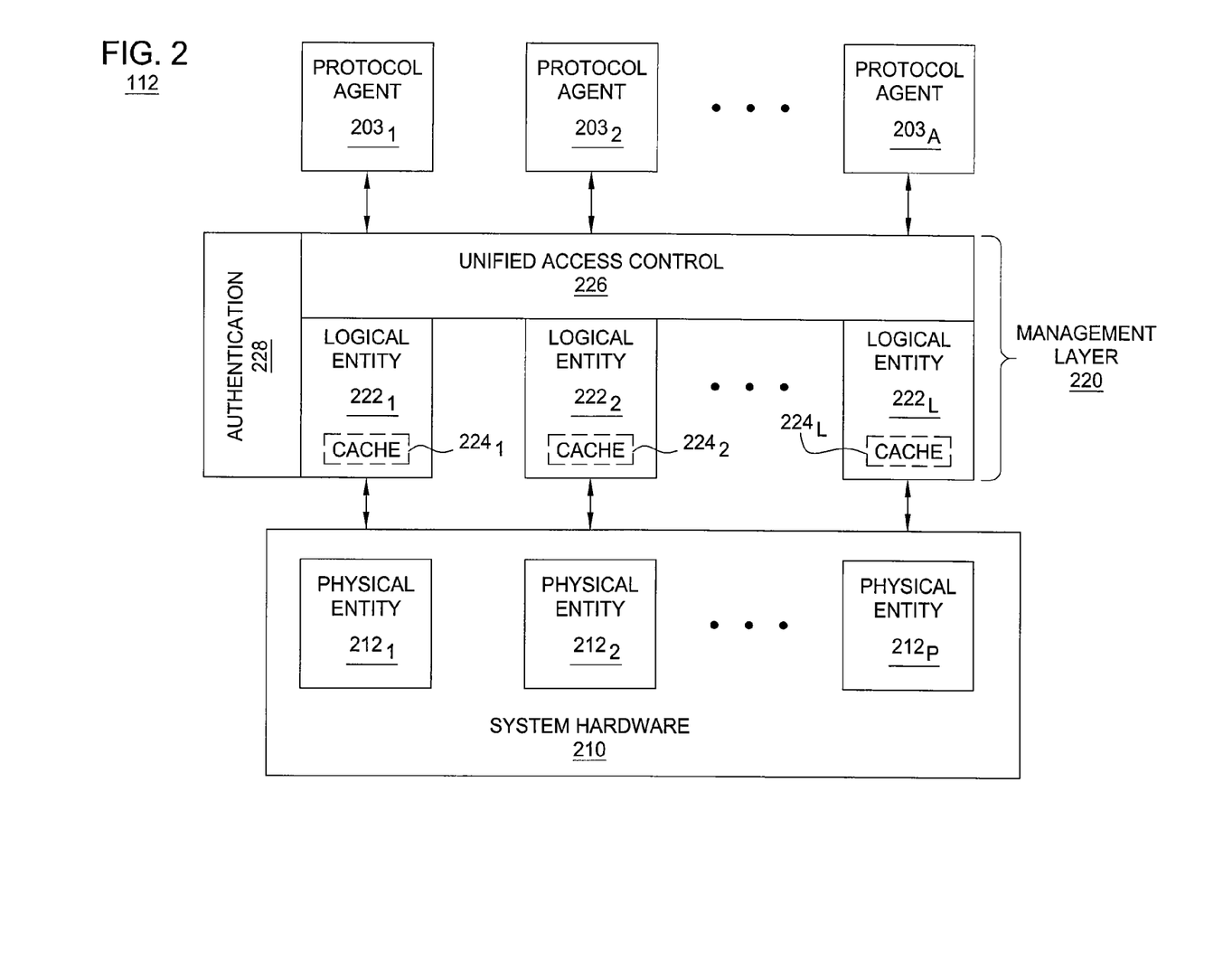
FIG. 2 depicts a high-level block diagram of a managed system of the communication network of FIG. 1.

FIG. 2 depicts a high-level block diagram of a managed system of the communication network of FIG. 1. Specifically, managed system 112 includes system hardware 210, a management layer 220, and a plurality of protocol agents $230_1$-$230_A$ (collectively, protocol agents 230). The system hardware 210 includes a plurality of physical entities $212_1$-$212_P$ (collectively, physical entities 212). The management layer 220 includes a plurality of logical entities $222_1$-$222_L$ (collectively, logical entities 222). In one embodiment, logical entities $222_1$-$222_L$ may include a plurality of caches $224_1$-$224_L$ (collectively, caches 224), respectively. The management layer 220 further includes a unified access control function 226 and an authentication function 228.

The system hardware 210 includes hardware (illustratively, physical entities 212) which, in combination with software, provides the functions of managed system 112. The managed system 112 may be managed by one or more management systems (illustratively, one or more of the management systems 120 depicted and described with respect to FIG. 1). The managed system 112 may be managed by one or more management systems through interactions between management systems 120 and protocol agents 230, between protocol agents 230 and management layer 220, and, if necessary, between management layer 220 and system hardware 210, as described herein.

As depicted in FIG. 2, the physical entities 212 (which may be referred to herein as physical system entities) include any hardware elements adapted for being managed by a management system using one or more management protocols. In one embodiment, for example, each of physical entities 212 may include one or more hardware elements, such as registers (e.g., binary registers, multi-state registers, and the like, as well as various combinations thereof), flip-flops, logic gates, counters, and the like hardware elements, as well as various combinations thereof.

As depicted in FIG. 2, logical entities 222 (which may be referred to herein as logical system entities) comprise logical representations of portions of system hardware 210 (illustratively, of physical entities 112). Specifically, as depicted in FIG. 2, logical entities $222_1$-$222_L$ logically represent physical entities $212_1$-$212_P$, respectively. The logical entities 222 include protocol-independent representations of physical entities 222. Although depicted and described with respect to a 1-to-1 mapping between logical entities 222 and physical entities 212, mappings between logical entities 222 and physical entities 212 may be 1-to-n, n-to-1, or m-to-n. In one embodiment, logical entities 222 of management layer 220 may be implemented as a unified information model (which may be better understood with respect to FIG. 7 and FIG. 8).

The logical entities 222 may include portions of software code by which management layer 220 is implemented. A logical entity 222 may include one or more objects, each object having one or more attributes, each attribute having one or more possible associated attribute values. For example, logical entity $222_1$ may logically represent a hardware register of system hardware 210 (e.g., physical entity $212_1$) designated for enabling (e.g., attribute value="enable") and disabling (e.g., attribute value="disable") a circuit. For example, logical entity $222_2$ may logically represent a hardware register of system hardware 210 (e.g., physical entity $212_2$) designated for activating (e.g., attribute value="on") and deactivating (e.g., attribute value="off") an alarm associated with a circuit.

As depicted in FIG. 2, protocol agents 230 include modules adapted for facilitating communication (upstream and downstream) between managed system 112 and multiple management systems (illustratively, management systems 120) using multiple management protocols. For example, protocol agent $230_1$ may facilitate communications between managed system 112 and management system $120_1$ using SNMP, protocol agent $230_2$ may facilitate communications between managed system 112 and management system $120_2$ using TL1, and the like, as well as various combinations thereof. The protocol agents 230 include respective pluralities of protocol entities which may be mapped to logical entities 222 of management layer 220. The protocol agents 230, as well as mappings between protocol agents 230 and logical entities 222, may be better understood with respect to FIG. 3.

As depicted in FIG. 2, the management layer 220 supports mappings between protocol entities of protocol agents 230 and logical entities 222 of management layer 220. More specifically, unified access control function 226 supports mappings between protocol entities of protocol agents 230 and logical entities 222 of management layer 220. As described herein, mappings between protocol entities of protocol agents 230 and logical entities 222 of management layer 220 may be at one or more of an entity level, an object level, an attribute level, and an attribute value level, and the like as well as various combinations thereof. The mappings between protocol entities of protocol agents 230 and logical entities 222 may be 1-to-n, n-to-1, or m-to-n.

In one embodiment, from the perspective of one protocol agent 230, one entity of one protocol agent 230 may be mapped to multiple logical entities 222, multiple entities of one protocol agent 230 may be mapped to one logical entity 222, multiple entities of one protocol agent 230 may be mapped to multiple logical entities 222, and the like, as well as various combinations thereof. In one embodiment, from the perspective of multiple protocol agents 230, entities of multiple protocol agents 230 may be mapped to one logical entity 222, entities of multiple protocol agents may be mapped to multiple logical entities 222, and the like, as well as various combinations thereof.

In one embodiment, at least a portion of management layer 220 is specified by an implementation of a unified information model (which, for purposes of clarity, may be referred to herein as a unified information model). In one embodiment, the unified information model may be implemented as software code. In one such embodiment, unified information model software code may be generated using an associated information model specification (e.g., by running the information model specification through a compiler). In one embodiment, protocol agents 230 may be implemented as software code. In one such embodiment, protocol agent software code of the respective protocol agents may be generated using respective protocol specifications (e.g., by running the protocol specifications through respective compilers). The unified information model and protocol agents, as well as use mappings between the unified information model and protocol agents, and reference mappings between the information model specification and the protocol specifications, may be better understood with respect to FIG. 6 and FIG. 7.

The management layer 220 performs user authentication functions. Specifically, authentication function 228 authenticates users of management systems 120. The authentication function 228 enables protocol-independent user authentication such that a user may be authenticated regardless of the protocol agent by which the user accesses the managed system, as well as regardless of the information model of the protocol agent by which the user accesses the managed system. In one embodiment, authentication occurs locally (e.g., authentication is performed by the managed system). In one embodiment, authentication occurs remotely. In one such embodiment, authentication may be performed by submitting an authentication request to a remote authentication service (e.g., an Authentication, Authorization, and Accounting (AAA) service).

In one embodiment, following successful authentication of a user by authentication function 228, authentication function 228 associates a user profile with the authenticated user. A user profile may include an indication of the system entities to which the associated user may be granted access (irrespective of the structure of the protocol agent by which the user accesses the system entities). In one embodiment, each user profile may include an access level parameter. In one embodiment, the access level parameter is assigned at the user level such that the user has the same level of access to each system entity to which the user is allowed access. In one embodiment, the access level parameter is assigned at the entity level such that the user may be provided different levels of access to different system entities on an entity-by-entity basis. The different levels of access may include levels such as read only, read and write, and the like, as well as various combinations thereof.

As described herein, management layer 220 provides a flexible, multi-agent interface which decouples system hardware 210 from protocol agents 230. The management layer 220, by decoupling system hardware 210 from protocol agents 230, enables system hardware 210 to be modified without necessarily requiring corresponding modifications to each of the protocol agents 230. Rather, since protocol entities of each of the respective protocol agents 230 are mapped to logical system entities 222 of management layer 220, modifications to system hardware 210 may merely require modifications to one or more logical system entities 222 of management layer 220 (e.g., to update the mappings between the logical system entities 222 and physical system entities 212), thereby obviating the need for modifications to protocol agents 230 in response to modifications to system hardware 210.

As described herein, system hardware 210, management layer 220, and protocol agents 230 facilitate communication of management information. The physical entities 212 are configured using configuration information received from logical entities 222 and provide status information to logical entities 222. The logical entities 222 receive configuration information from protocol agents 230, cache the configuration information (if logical entities 222 include associated caches), and provide the configuration information to physical entities 212. The logical entities 222 receive status information from physical entities 212, cache the status information (if logical entities 222 include associated caches), and provide the status information to protocol agents 230. The protocol entities 230 receive configuration information from management systems and provide the configuration information to logical entities 222. The protocol entities 230 receive status information from logical entities 222 and provide the status information to management systems.

The management layer 220 facilitates downstream communications between protocol agents 230 and system hardware 210. The interactions between protocol agents 230, management layer 220, and system hardware 210 in the downstream direction (e.g., for configuration of system hardware 210, retrieval of status information from system hardware 210, and the like) may be better understood with respect to FIG. 3 and FIG. 4. The management layer 220 facilitates upstream communications between system hardware 210 and protocol agents 230. The interactions between system hardware 210, management layer 220, and protocol agents 230 in the upstream direction (e.g., for autonomous reporting by system hardware 210) may be better understood with respect to FIG. 3 and FIG. 5. The management layer 220 facilitates user authentication functions.

Figure 3:
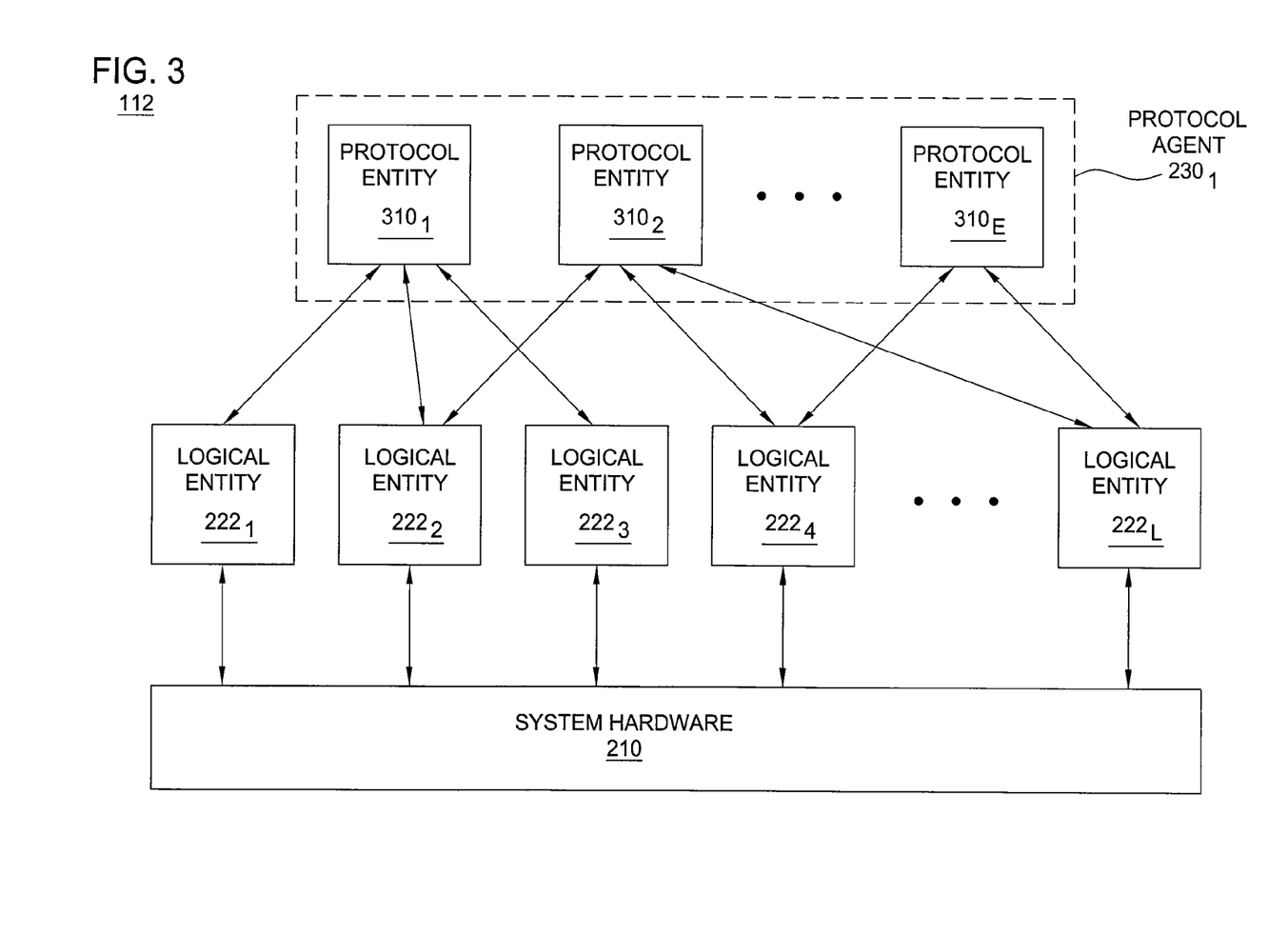
FIG. 3 depicts a high-level block diagram of the managed system of FIG. 2 for one protocol agent.

FIG. 3 depicts a high-level block diagram of the managed system of FIG. 2 for one protocol agent. Specifically, managed system 112 includes system hardware 210, a plurality of logical entities $222_1$-$222_K$ (collectively, protocol entities 222), and protocol agent $230_1$. As depicted in FIG. 2, protocol agent $230_1$ includes a plurality of protocol entities $310_1$-$310_E$ (collectively, protocol entities 310). The logical entities $222_1$-$222_L$ depicted in FIG. 3 include at least a portion of logical entities $222_1$-$222_L$ depicted in FIG. 2 (since protocol entities 310 of protocol agent $230_1$ may be mapped to some or all of logical entities $222_1$-$222_L$). Although depicted and described herein with respect to one protocol agent for purposes of clarity, each logical entity 222 may be mapped to one or more protocol entities of one or more protocol agents.

As depicted in FIG. 3, protocol entities 310 include respective portions of software code of which protocol agent $230_1$ is comprised. A protocol entity 310 includes a protocol-specific implementation that facilitates communication between management systems (illustratively, management systems 120) and logical entities 222 of management layer 220 of managed system 112. More specifically, a protocol entity 310 may include one or more objects, each object having one or more attributes, each attribute having one or more possible associated attribute values. As described herein, protocol-specific objects, attributes, and attribute values of one or more protocol entities 310 are mapped to protocol-independent objects, attributes, and attribute values of one or more logical entities 222

As described herein, mappings between protocol entities $310$ of protocol agent $230_1$ and logical entities $222$ of management layer $220$ may be 1-to-n, n-to-1, or m-to-n. For example, as depicted in FIG. 3, protocol entity $310_1$ is mapped to logical entities $222_1$, $222_2$, and $222_3$, protocol entity $310_2$ is mapped to logical entities $222_2$, $222_4$, and $222_K$, and protocol entity $310_E$ is mapped to logical entities $222_4$ and $222_K$. Similarly, as depicted in FIG. 3, logical entity $222_1$ is mapped to protocol entity $310_1$, logical entity $222_2$ is mapped to protocol entities $310_1$ and $310_2$, logical entity $222_3$ is mapped to protocol entity $310_1$, logical entity $222_4$ is mapped to protocol entities $310_2$ and $310_E$, and logical entity $222_K$ is mapped to protocol entities $310_2$ and $310_E$.

As described herein, the mappings between entities may be mappings between various different combinations of objects, attributes, and attribute values (i.e., one or more entities, objects, attributes, and attribute values of a protocol agent may map to one or more entities, objects, attributes, and attribute values of the unified information model by which system hardware 210 is represented). The mappings between protocol entities 310 and logical entities 222 facilitate downstream communications between management systems 120 and logical entities 222 (as depicted and described herein with respect to FIG. 4). The mappings between logical entities 222 and protocol entities 310 facilitate upstream communications between logical entities 222 and management systems 120 (as depicted and described herein with respect to FIG. 5).

Figure 4:
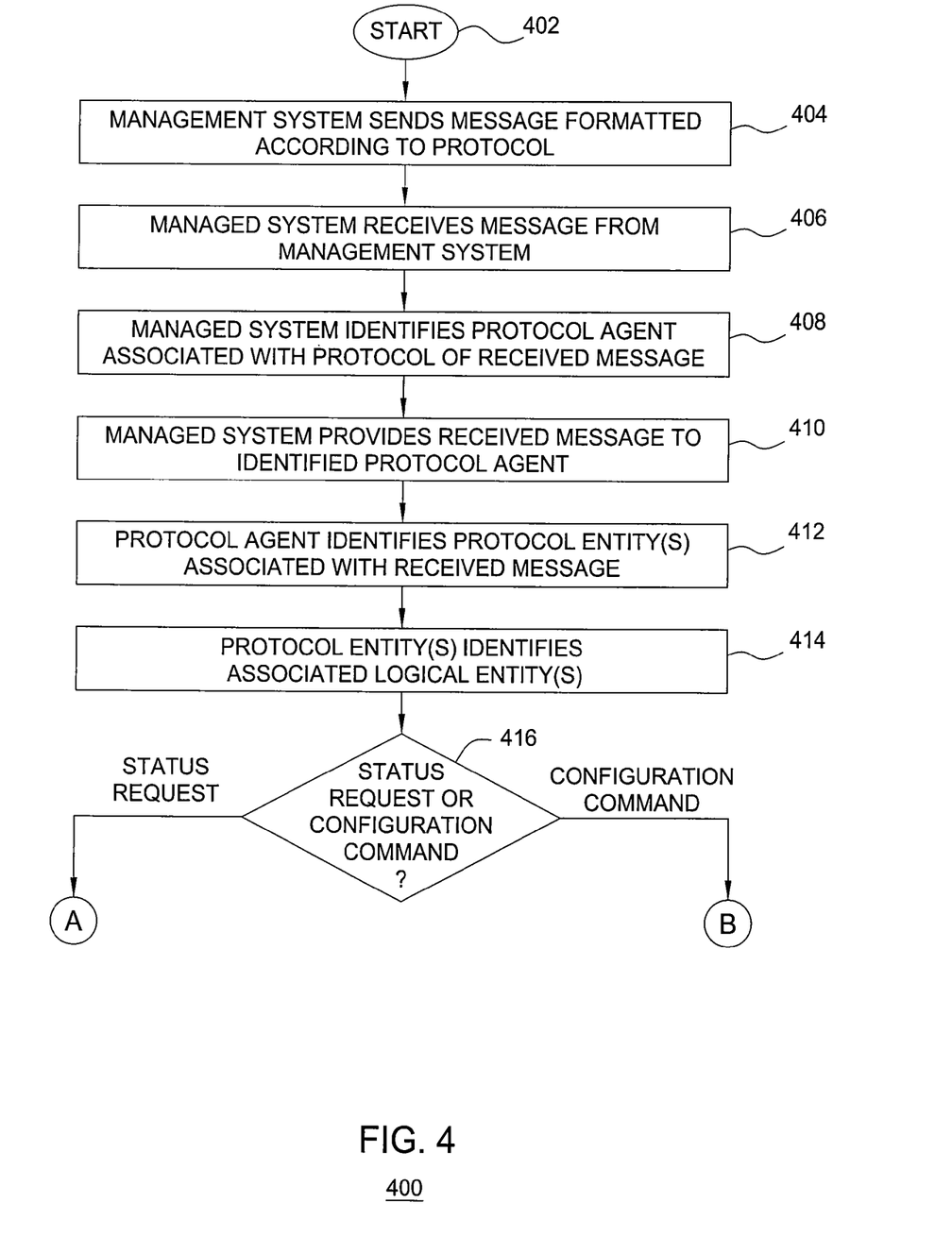
FIG. 4 depicts a method according to one embodiment of the present invention.

FIG. 4 depicts a method according to one embodiment of the present invention. Specifically, method 400 is a method for propagating information downstream from a management system to system hardware of a managed system. The information may include information adapted for retrieving status from system hardware, information adapted for configuring system hardware (denoted as configuration information), and like information, as well as various combinations thereof. Although primarily depicted and described herein as being performed serially, at least a portion of the steps of method 400 may be performed contemporaneously, or in a different order than presented in FIG. 4. The method 400 begins at step 402 and proceeds to step 404.

At step 404, a management system (illustratively, one of management systems 120 of FIG. 1) sends a message to a managed system (illustratively, one of managed systems 112 of FIG. 1). The message is formatted according to one of a plurality of management protocols (e.g., CMIP, SNMP, TL1, and the like). At step 406, the managed system receives the message from the management system. At step 408, the managed system identifies a protocol agent associated with the management protocol of the received message (illustratively, protocol agent 2301 of FIG. 3). At step 410, the managed system provides the received message to the identified protocol agent.

At step 412, the protocol agent identifies one or more protocol entities (illustratively, protocol entities 310) associated with the received message. The protocol agent identifies one or more protocol entities associated with the received message by processing the contents of the received message. For example, the protocol agent may identify the one or more protocol entities using field names and/or associated field values in the received message. At step 414, the protocol agent identifies one or more logical entities (illustratively, logical entities 222). The protocol agent identifies the one or more logical entities using the identified one or more protocol entities. In one embodiment, the protocol agent identifies the one or more logical entities using mappings (e.g., use mappings 635 of FIG. 6) between the one or more protocol entities and the one or more logical entities.

At step 416, a determination is made as to whether the received message includes a status request or a configuration command. If the received message includes a status request, method 400 proceeds to step 418. If the received message includes a configuration command, method 400 proceeds to step 424. Although omitted for purposes of clarity, a received message may include both a status request (or multiple status requests) and a configuration command (or multiple configuration commands), in which case steps 418-422 and 424-434 may be performed serially, or alternatively, at least a portion of the steps may be performed in parallel. Although depicted and described as being performed at a specific time, the determination as to whether the received message includes a status request or a configuration command may be performed at any time by processing the contents of the received message.

At step 418, the protocol agent requests status from the identified one or more logical entities. At step 420, the one or more logical entities provide the requested status to the protocol agent. The manner in which the one or more logical entities retrieves the requested status in order to provide the requested status to a protocol agent depends on whether or not the logical entities include associated caches, as described herein below. At step 422, the protocol agent provides the requested status to the management system (i.e., the management system from which the message was received). From step 422, method 400 proceeds to step 436, where method 400 ends.

In one embodiment, in which the identified one or more logical entities include associated caches (illustratively, caches 224 of logical entities 222), the one or more logical entities may serve the request from the one or more associated caches. In one such embodiment, each logical entity determines if the associated cache is current (i.e., up-to-date). If the cache of the logical entity is current, the logical entity serves the request using data stored in the cache. If the cache of the logical entity is not current (or is empty), the logical entity retrieves the requested status from one or more associated physical entities (illustratively, physical entities 212). In one embodiment, in which the identified one or more logical entities do not include associated caches, the protocol agent requests status from the identified one or more logical entities, which in turn retrieves the requested status from the associated physical entity or entities (illustratively, physical entities 212).

At step 424, the protocol agent sends one or more requests to the identified one or more logical entities. At step 426, the identified one or more logical entities receive the one or more requests. At step 428, if the identified one or more logical entities include associated caches, the identified one or more logical entities update the one or more caches with information from the one or more requests, otherwise method 400 proceeds to step 430. At step 430, the one or more logical entities identify the associated one or more physical entities. At step 432, the one or more logical entities send one or more attribute value change commands to the identified one or more physical entities. At step 434, the one or more physical entities are configured using the one or more attribute value change commands (i.e., the physical hardware components such as registers, flip-flops, and the like, are set according to the attribute value change commands). From step 434, method 400 proceeds to step 436, where method 400 ends.

Figure 5:
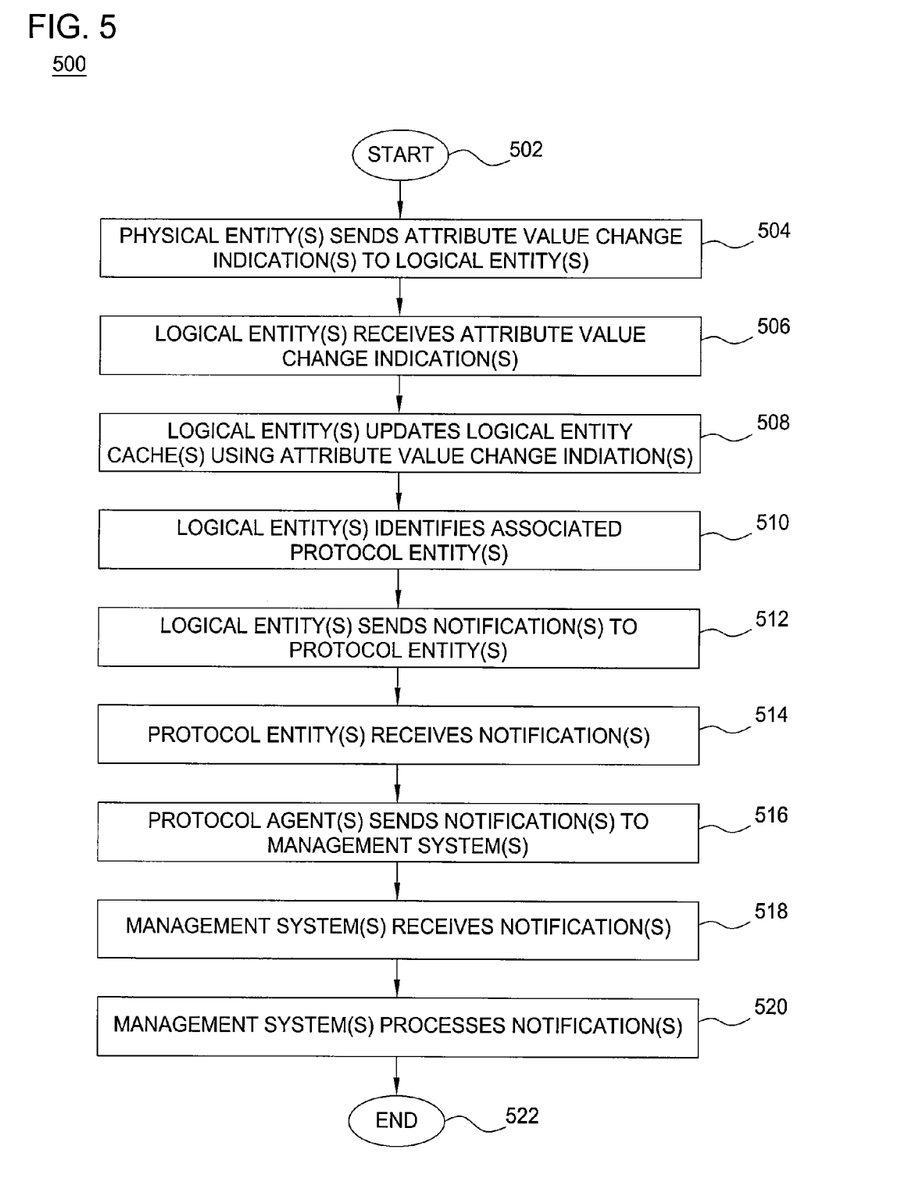
FIG. 5 depicts a method according to one embodiment of the present invention.

FIG. 5 depicts a method according to one embodiment of the present invention. Specifically, method 500 includes a method for propagating information upstream from system hardware of a managed system to a management system. The information may include status information, configuration information, and the like, as well as various combinations thereof. Although primarily depicted and described herein as being performed serially, at least a portion of the steps of method 500 may be performed contemporaneously, or in a different order than presented in FIG. 5. The method 500 begins at step 502 and proceeds to step 504.

At step 504, a physical entity (illustratively, one of the physical entities 212) sends one or more attribute value change notifications to one or more associated logical entities (illustratively, logical entities 222). At step 506, the one or more logical entities receive the one or more attribute value change notifications. At step 508, if the one or more logical entities include associated caches, the one or more logical entities update the caches associated with the one or more logical entities using the one or more attribute value change indications, otherwise method 500 proceeds to step 510.

At step 510, the one or more logical entities identify one or more protocol entities associated with the one or more logical entities. The identified protocol entities (which may include one or more protocol entities for each of the protocol agents of the managed system) include protocol entities impacted by the one or more attribute value change notifications received by the one or more logical entities. In one embodiment, the one or more logical entities identify the one or more protocol entities using mappings between protocol entities and logical entities (e.g., use mappings 635 of FIG. 6).

In one embodiment, the one or more protocol entities impacted by the one or more attribute value change notifications are identified by determining, for each protocol agent (e.g., by iterating over each of the protocol agents), whether that protocol agent includes any protocol entities impacted by the one or more attribute value change notifications received by the one or more logical system entities. In one such embodiment, only a protocol agent having an active session with a management system is considered in determining whether the protocol agent includes any protocol entities impacted by the one or more attribute value change notifications (i.e., protocol agents for which there is no active management session do not have a session over which to send a notification, so performing such a check is not required).

At step 512, the one or more logical entities send one or more notifications to the identified one or more protocol entities. The one or more logical entities may send one or more notifications to one or more protocol entities of one protocol agent or multiple different protocol agents (i.e., where multiple management systems, which are using different management protocols, require information conveyed by the notifications). At step 514, the one or more protocol entities receive the one or more notifications. At step 516, the one or more protocol agents send one or more notifications to one or more management systems. At step 518, the one or more management systems receive the one or more notifications. At step 520, the one or more management systems process the one or more notifications. At step 522, method 500 ends.

The method of FIG. 5 may be better understood with respect to the following example. In this example, assume that, upon detection of a Loss Of Signal (LOS) alarm for a circuit traversing a network element, a physical entity associated with that circuit in the system hardware (e.g., a hardware register) of the network element may be set in a manner indicating detection of the LOS alarm (e.g., the hardware register may be changed from OFF to ON). In response to the change in the value of the physical entity, the physical entity sends an attribute value change notification to an associated logical entity (or multiple logical entities if the physical entity is managed using multiple logical entities) in order to update the associated logical entity. The logical entity receives the attribute value change notification from the physical entity. The logical entity (including any cache or caches associated with the logical entity) is updated according to the attribute value change notification.

In continuation of the present example, for purposes of clarity, assume that the physical entity associated with the circuit is associated with one logical entity. Further assume that the logical entity includes multiple objects, one of which includes an ALARM attribute and an ALARM TYPE attribute. Furthermore, assume that possible attribute values for the ALARM attribute include OFF and ON and possible attribute values for the ALARM TYPE attribute include LOS, LOF (Loss Of Frame), and AIS (Alarm Indication Signal). In this example, in response to the attribute value change notification, the ALARM attribute of the object of the logical entity is set equal to ON and the ALARM TYPE attribute of the object of the logical entity is set equal to LOS. In one embodiment, in which the logical entity includes a cache, the ALARM and ALARM TYPE attribute values may be stored in the cache.

In continuation of the present example, in response to the updates to the logical entity (i.e., to the ALARM and ALARM TYPE attribute values of the logical entity), one or more protocol entities are identified. The one or more identified protocol entities are updated using the updates to the logical entity. The one or more protocol entities may be associated with one protocol agent or multiple protocol agents (depending on how many management systems should receive information about the updated to the physical/logical system entity). In other words, as depicted and described herein, each logical entity may be associated with one protocol entity of one protocol agent, multiple protocol entities of one protocol agent, multiple protocol entities across multiple protocol agents, and the like.

In continuation of the present example, for purposes of clarity, assume that two protocol entities are identified and updated using the updates to the logical entity (i.e., two protocol entities are mapped to the one logical system entity). In continuation of this example, further assume that the two protocol entities associated with the one logical system entity are associated with two different protocol agents (denoted as a first protocol entity associated with a first protocol agent and a second protocol entity associated with a second protocol agent). In continuation of this example, further assume that the two different protocol agents serve two different management systems (denoted as a first management system and a second management system).

In continuation of the present example, with respect to the first protocol entity of the first protocol agent, assume that the ALARM and ALARM TYPE attributes of the logical entity map to ALARM DISPLAY and ALARM COLOR attributes, respectively, of an object of the first protocol entity of the first protocol agent, where the first protocol agent is adapted for facilitating communication between the managed system and the first management system (e.g., a fault management system). In continuation of the present example, assume that valid ALARM DISPLAY attribute values include NO and YES, and valid ALARM COLOR attribute values include RED, ORANGE, and YELLOW.

In continuation of the present example, with respect to the mapping between the logical entity object and protocol entity object of the first protocol entity, assume that when ALARM=OFF then ALARM DISPLAY=NO and when ALARM=ON then ALARM DISPLAY=YES. With respect to the mapping between the logical entity object and protocol entity object, assume that when ALARM DISPLAY=YES, attributes of the protocol entity object are set as follows: ALARM TYPE=LOS corresponds to ALARM COLOR=RED, ALARM TYPE=LOF corresponds to ALARM COLOR=ORANGE, and ALARM TYPE=AIS corresponds to ALARM COLOR=YELLOW.

In continuation of the present example, since the logical entity object was updated such that the ALARM attribute was set equal to ON and the ALARM TYPE attribute was set equal to LOS, according to the mappings described hereinabove the protocol entity object is updated such that the ALARM DISPLAY attribute is set equal to YES and the ALARM COLOR attribute is set equal to RED. The first protocol agent sends a notification to the first management system served by the first protocol agent. The first protocol agent sends the notification to the first management system according to the management protocol supported by the first protocol agent and the first management system (e.g., SNMP, TL1, and the like).

In continuation of the present example, the notification provides an indication to the first management system of the LOS alarm on the circuit (note that the circuit may be identified in the notification using a circuit identifier or other similar identifiers). The first management system receives and processes the notification from the first protocol agent. For example, since the first management system is a fault management system, the fault management system may display the LOS alarm condition on a graphical user interface associated with the management system (e.g., displaying the circuit identifier with a flashing red indicator indicative of a serious alarm condition (i.e., LOS) associated with the circuit).

In continuation of the present example, as described herein, in addition to triggering an update of the first protocol entity of the first protocol agent, the update to the logical system entity further triggers an update of the second protocol entity of the second protocol agent, which in turn triggers one or more notifications to the second management system associated with the second protocol agent. The second protocol entity of the second protocol agent may trigger notifications to the second management system that are different than the notifications triggered by the first protocol entity to the first management system.

For example, the ALARM and ALARM TYPE attributes of the logical entity may map to different attributes (e.g., different numbers of attributes, different formats and combinations of attributes, and the like), as well as different associated attribute values, for the second protocol entity of the second protocol agent (i.e., different than the ALARM DISPLAY and ALARM COLOR attributes of the first protocol entity). For example, rather than mapping to ALARM DISPLAY and ALARM COLOR attributes (as the first protocol entity does), the ALARM and ALARM TYPE attributes of the logical entity may map to an ALARM SEVERITY attribute (e.g., ALARM TYPE=LOS maps to a first severity level (e.g., SEV1), ALARM TYPE=LOF maps to a second severity level (e.g., SEV2), and ALARM TYPE=AIS maps to a third severity level (e.g., SEV3).

In other words, although descriptions of specific mappings and updates with respect to the second protocol agent are omitted, it should be noted that the present invention enables multiple management systems (which may communicate using different management protocols) to receive notifications in response to a single update of a logical system entity. Furthermore, although specific mappings and updates with respect to the second protocol agent are omitted, it should be noted that the present invention enables management systems to receive different notifications (e.g., notifications which represent system state changes in a different way, such as notifications supporting different attributes, different attribute formats and values, and the like, as well as various combinations thereof) in response to a single update of a logical system entity.

Figure 6:
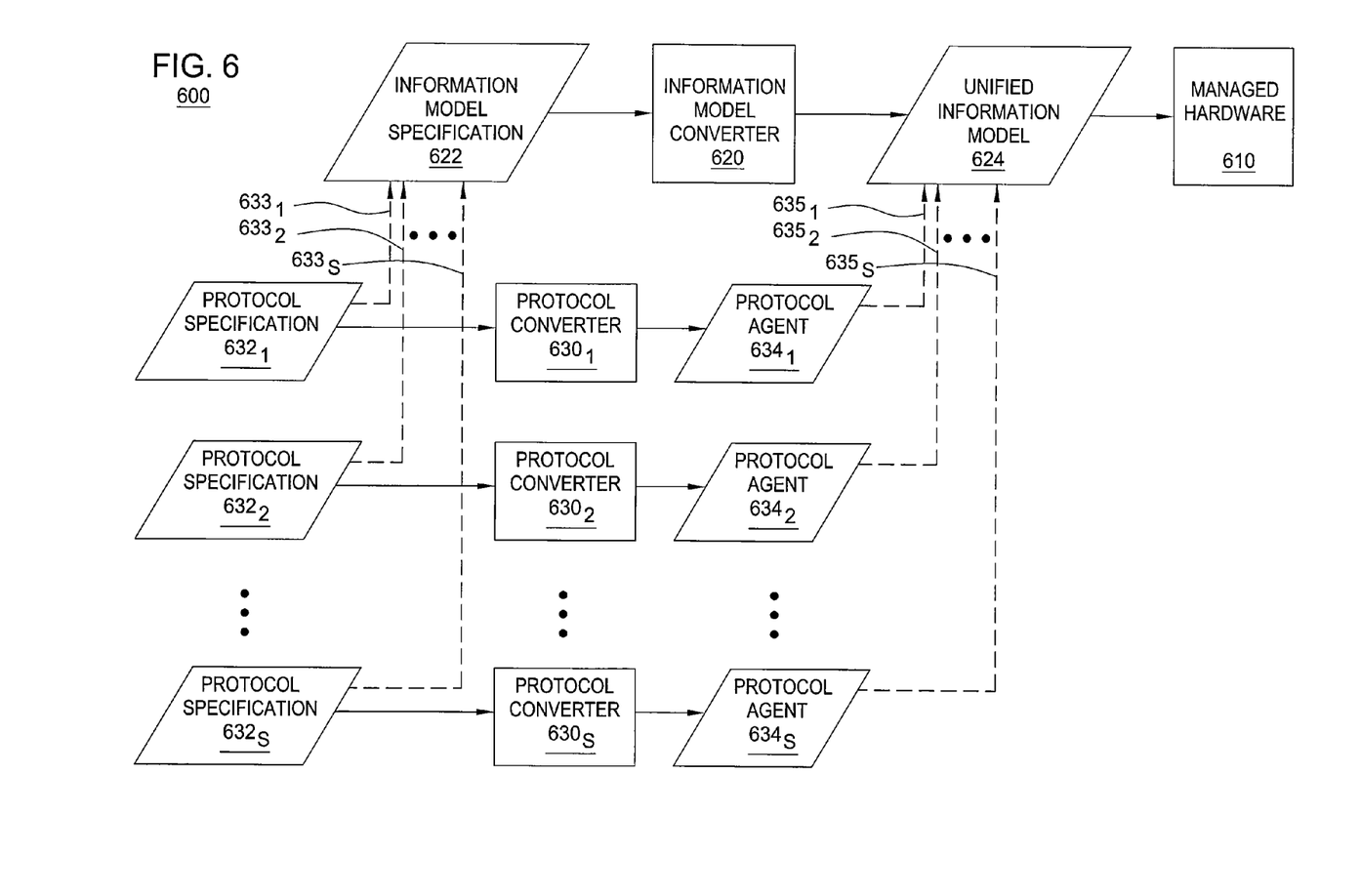
FIG. 6 depicts a high-level block diagram of a system adapted for generating a unified information model and protocol agents for use in the managed system of FIG. 2.

FIG. 6 depicts a high-level block diagram of a system adapted for generating a unified information model and protocol agents for use in the managed system of FIG. 2 and FIG. 3. Specifically, system 600 of FIG. 6 includes managed hardware 610, an information model converter 620, and a plurality of protocol converters $630_1$-$630_S$ (collectively, protocol converters 630). Although depicted and described as being included within the system on which the unified information model and protocol agents are generated, managed hardware 610 includes hardware on the managed system for which the unified information model and protocol agents are generated.

As depicted in FIG. 6, information model converter 620 accepts as input an information model specification 622. The information model specification 622 includes a model of system hardware 610. The information model specification 622 is implemented as a formal requirements document by means of a formal notation (e.g., a context-free grammar). In one embodiment, information model specification 622 models system hardware 610 using entities, objects, attributes, and attribute values, where each entity may include one or more objects, each object may include one or more attributes, and each attribute may have one or more valid attribute values.

As depicted in FIG. 6, protocol converters $630_1$-$630_S$ accept as input a plurality of protocol specifications $632_1$-$632_S$ (collectively, protocol specifications 632), respectively. A protocol specification is a model of a management protocol. The protocol specifications 632 are implemented as formal requirements documents, respectively (by means of one or more formal notations). For example, protocol specification $632_1$ may include a model of SNMP as SNMP maps onto information model specification 622, protocol specification $632_2$ may include a model of TL1 as TL1 maps onto information model specification 622, and the like.

In one embodiment, at least a portion of the protocol specifications 632 are specified in terms of commands, command parameters, and parameter values, where each command may include one or more parameters, and each parameter may have one or more valid parameter values. In one embodiment, at least a portion of the protocol specifications 632 are specified using entities, objects, attributes, and attribute values, where each entity may include one or more objects, each object may include one or more attributes, and each attribute may have one or more valid attribute values.

As depicted in FIG. 6, protocol specifications $632_1$-$632_S$ are specified such that a plurality of mappings $633_1$-$633_S$ (collectively, mappings 633) are established between protocol specifications $632_1$-$632_S$ and information model specification 622, respectively. The mappings $633_1$-$633_S$ associated with protocol specifications $632_1$-$632_S$ essentially operate as "reference" relationships whereby entities, objects, attributes, and attribute values of protocol specifications $632_1$-$632_S$ are mapped to entities, objects, attributes, and attribute values of information model specification 622 such that entities (as well as associated objects, attributes, and attribute values) of protocol specifications $632_1$-$632_S$ reference entities (as well as associated objects, attributes, and attribute values) of information model specification 622.

Although primarily depicted and described using a one-to-one mapping between information model specification 622 and information model converter 620, in other embodiments, multiple information model specifications 622 may be input to information model converter 620. Although primarily depicted and described using a one-to-one mapping between protocol converts 630 and protocol specifications 632, in other embodiments, multiple protocol specifications 632 may be input to a single protocol converter 630, one protocol specification 632 may be input to multiple protocol converters 620, and the like, as well as various combinations thereof. Similarly, although primarily depicted and described with respect to specific mappings 633, various other combinations of mappings 633 may be supported.

The information model converter 620 converts the information model specification 622 into a unified information model 624. The unified information model 624 is one implementation of the unified information model (since the unified information model 624 may be implemented in various other ways depending on numerous factors). The generation of unified information model 624 from information model specification 622 may be better understood with respect to FIG. 7. The unified information model 624 is a programming language implementation of information model specification 622. In one embodiment, management layer 220 depicted and described with respect to FIG. 2 and FIG. 3 may be implemented using the unified information model 624 depicted and described with respect to FIG. 6.

The protocol converters $630_1$-$630_S$ convert protocol specifications $632_1$-$632_S$ into a plurality of protocol agents $634_1$-$634_S$ (collectively, protocol agents 634), respectively. The generation of protocol agents $634_1$-$634_S$ from protocol specifications $632_1$-$632_S$ may be better understood with respect to FIG. 7. The protocol agents $634_1$-$634_S$ comprise programming language implementations of protocol specifications $632_1$-$632_S$, respectively. In one embodiment, protocol agents $230_1$-$230_A$ depicted and described with respect to FIG. 2 and FIG. 3 may be implemented using at least a subset of the protocol agents $634_1$-$634_S$ depicted and described with respect to FIG. 6. Although omitted for purposes of clarity, each protocol converter 630 may generate one or more implementations of a protocol agent using one or more protocol specifications 632 input to the protocol converter 632.

As depicted in FIG. 6, by converting information model specification 622 into unified information model 624, and converting protocol specifications $632_1$-$632_S$ into protocol agents $634_1$-$634_S$, mappings $633_1$-$633_S$, which operate as "reference" relationships, are thereby converted into mappings $635_1$-$635_S$ (collectively, mappings 635), respectively, which operate as "use" relationships. The mappings $635_1$-$635_S$ operate as "use" relationships in that protocol agents $634_1$-$634_S$ use mappings $635_1$-$635_S$ for facilitating communications between management systems (illustratively, management systems 120) and a managed system in which unified information model 624 and protocol agents $634_1$-$634_S$ are implemented (illustratively, one of the managed systems 112).

As described herein, each mapping 635 may include mappings from one protocol entity of the associated protocol agent 634 to one logical entity of unified information model 624 (i.e., 1-to-1), from one protocol entity of the associated protocol agent 634 to multiple logical entities of unified information model 624 (i.e., 1-to-n), and from multiple protocol entities of the associated protocol agent 634 to one logical entity of unified information model 624 (i.e., n-to-1). Furthermore, each of such mappings 635 may include mappings between various combinations of objects, attributes, and attribute values of logical entities of the associated protocol agent 634 to various combinations of objects, attributes, and attribute values of logical entities of unified information model 624.

As further described herein, mappings 635 may support various other combinations of entity, object, attribute, and attribute value mappings. The mappings 635 may include mappings from entities of multiple protocol agents 634 to one entity of unified information model 624. The mappings 635 may include mappings of attributes of multiple different objects of multiple different entities of multiple different protocol agents 634 to one object of one entity of unified information model 634. The mappings 635 may include mappings of one or more attribute values of different protocol agents 634 to one or more attribute values of different entities of unified information model 624. Although described with respect to various combinations of mappings, mappings 633 and mappings 635 may be any mappings.

Figure 7:
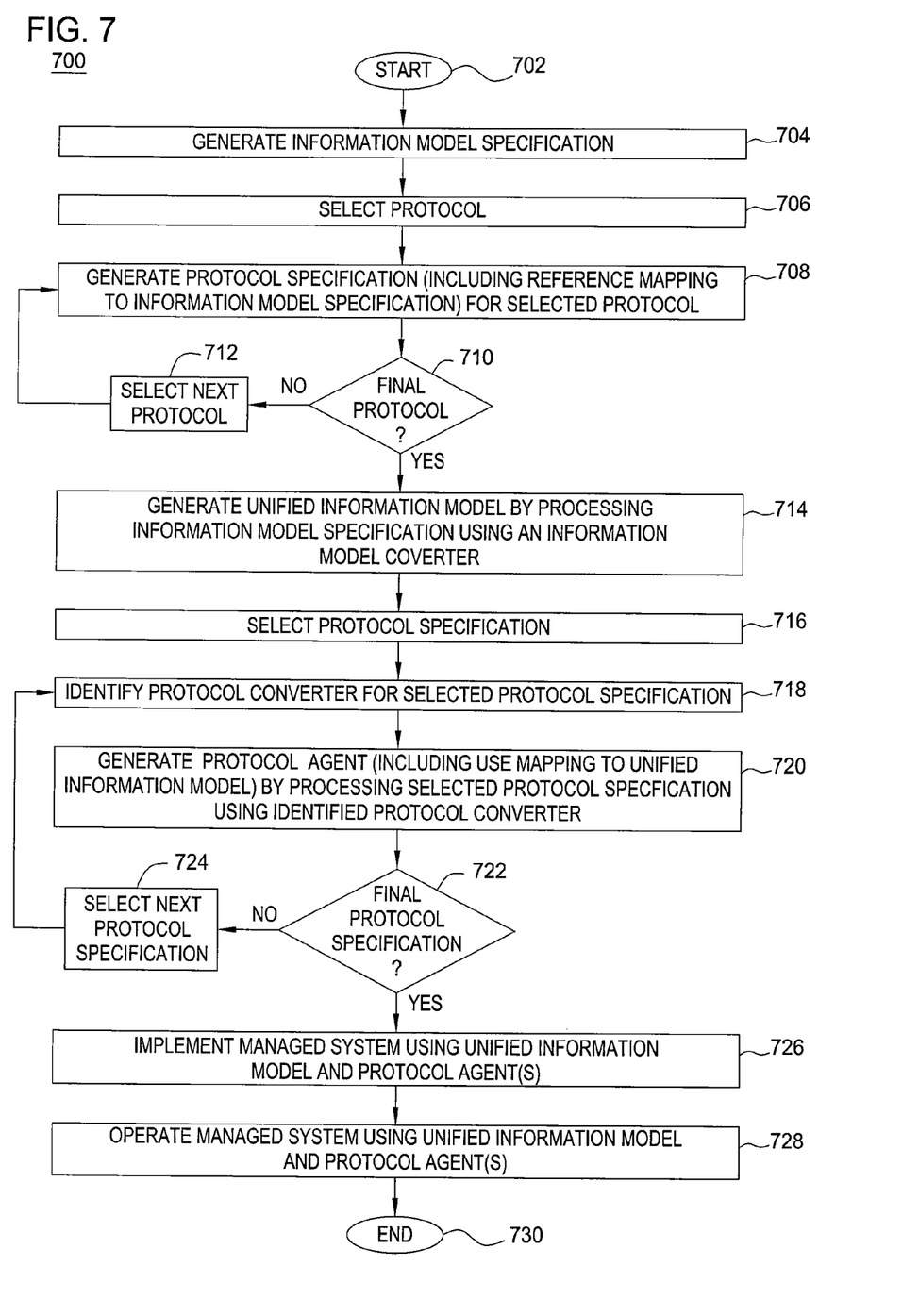
FIG. 7 depicts a method according to one embodiment of the present invention.

FIG. 7 depicts a method according to one embodiment of the present invention. Specifically, method 700 includes a method for generating a unified information model and associated protocol agents adapted for use by a managed system. As described herein, the unified information model and protocol agents are generated in a manner for establishing mappings between the protocol agents and the unified information model, where the established mappings may be used to facilitate communication between the managed system and management systems. Although primarily depicted and described herein as being performed serially, at least a portion of the steps of method 700 may be performed contemporaneously, or in a different order than presented in FIG. 7. The method 700 begins at step 702 and proceeds to step 704.

At step 704, an information model specification is generated. The information model specification includes a formal specification of the hardware of the managed system being implemented. At step 706, a protocol is selected. The protocol may include any protocol (e.g., management protocols such an SNMP, TL1, CMIP, and the like). At step 708, a protocol specification is generated for the selected protocol. The generated protocol specification includes mappings to the information model specification (i.e., reference mappings as described herein).

At step 710, a determination is made as to whether the final protocol has been selected. If the final protocol has not been selected, method 700 proceeds to step 712. At step 712, a next protocol is selected. From step 712, method 700 returns to step 708. If the final protocol has been selected (i.e., all protocol specifications required to implement, or at least to initially implement and deploy, the managed system have been generated), method 700 proceeds to step 714. As described herein, additional protocol agents may be generated for a managed system after the managed system is already implemented and deployed for operation.

At step 714, a unified information model is generated. The unified information model is generated by processing the information model specification using an information model converter. In one embodiment, the information model converter is a software compiler such that the unified information model is a software implementation of the information model specification. The unified information model is protocol-independent, thereby enabling interaction between system hardware (i.e., of the managed system to be implemented) and multiple management systems using multiple different protocols At step 716, a protocol specification (i.e., one of the generated protocol specifications) is selected. At step 718, a protocol converted is identified. The identified protocol converter is a protocol converter adapted for processing the selected protocol specification. At step 720, a protocol agent is generated. The protocol agent is generated by processing the protocol specification using the identified protocol converter. The generated protocol agent includes mappings to the unified information model (i.e., use mappings as described herein). In one embodiment, the protocol converter is a software compiler such that the protocol agent is a software implementation of the protocol specification.

At step 722, a determination is made as to whether the final protocol specification has been selected. If the final protocol specification has not been selected, method 700 proceeds to step 724. At step 722, a next protocol specification is selected. From step 724, method 700 returns to step 718, at which point a protocol converter is identified for the selected protocol specification. If the final protocol specification has been selected (i.e., all protocol agents required to implement the managed system have been generated), method 700 proceeds to step 726.

At step 726, a managed system is implemented using the generated unified information model and the generated protocol agent(s). The managed system may be implemented as depicted and described herein with respect to FIG. 2 and FIG. 3. At step 728, the implemented managed system operates using the generated unified information model and the generated protocol agent(s). The managed system may operate as depicted and described herein with respect to FIG. 4 and FIG. 5. At step 730, method 700 ends.

Although depicted and described herein as being performed serially, in other embodiments, many of the steps of method 700 may be performed in parallel. For example, although the protocol specifications are depicted and described as being generated serially, in one embodiment, at least a portion of the protocol specifications may be generated in parallel. Furthermore, at least a portion of the protocol specifications may be generated in parallel with the generation of the information model specification. Similarly, although the protocol agents are depicted and described as being generated serially, in one embodiment, at least a portion of the protocol agents may be generated in parallel. Furthermore, at least a portion of the protocol agents may be generated in parallel with the generation of the unified information model.

Although primarily depicted and described herein with respect to an embodiment in which all protocol specifications are defined when the information model specification is defined, protocol specifications may be defined at any time. Similarly, although primarily depicted and described herein with respect to an embodiment in which all protocol agents are generated when the unified information model is generated, protocol agents may be generated at any time. For example, one or more protocol specifications may be specified and processed by protocol converters to form one or more protocol agents after the associated managed system has already been implemented and deployed for operation.

In other words, the present invention may be used to grow managed systems such that additional protocol agents may be added to the managed system over time, as the additional protocol agents become necessary (as opposed to requiring all protocol agents that may ever be required to be generated at the time the managed system is deployed for operation). Thus, with respect to FIG. 7, steps 706-712 may be repeated any number of times, at any time before or after the managed system is deployed. Similarly, with respect to FIG. 7, steps 716-724 may be repeated any number of times, at any time before or after the managed system is implemented and deployed for operation.

As described herein, the present invention provides advantageous features. The management layer operates as an abstraction layer between management agents processing management protocols and actual hardware of the communication system being managed. The management layer implements an arbitrarily laid-out, domain-specific or system-specific, information model. The information models of the multiple management protocols are mapped onto the protocol-independent information model implemented within the management layer. The management protocols, and the mapping of management protocol information models onto the protocol-independent information model of the management layer, are formally specified by respective requirements documents, such that the mappings can be automatically generated from the formal requirements documents. The mappings between the information models of the employed management protocols and the information model of the management layer is used for all data exchange, both downstream and upstream (i.e., there is no need for a bypass which is normally required in existing systems).

The management layer translates management requests between the management system domain and the managed system domain, and, optionally, caches data associated with management requests as the data passes from protocol agents to physical entities of the managed system. The management layer translates management notifications between the managed system domain and the management system domain, and caches data associated with management notifications as the data passes from physical entities of the managed system to protocol agents. More specifically, the management layer (i.e., the logical entities contained therein, respectively) forwards attribute value change indications to affected management protocol instances in compliance with respective protocol-specific information models of the management protocol instances, while taking into account access-control permissions. The managed system notifies the management layer about synchronous and asynchronous attribute value changes to the physical system entities.

The attribute values associated with physical system entities of the managed system, for both downstream and upstream data exchanges, are cached within the management layer. The caching of configuration information and state information within the management layer offers system designers significantly more freedom as to where to locate persistent storage (if required) for the configuration information and state information. Once the information has been cached, successive requests of state information for that managed system can be satisfied from the caches of the associated logical system entities, thereby preventing additional requests to the physical system entities and, as such, providing a significant performance advantage over existing systems. Updating of caches in response to state change indications ensures that the management layer remains synchronized with the physical system entities, and enables triggering of attribute-value change indications such as SNMP traps, TL1 change notifications, and like attribute-value change indications associated with other protocols.

The management layer provides access control functions in addition to data exchange functions. Specifically, access to logical system entities within the management layer (which represent physical system entities of a managed system) is controlled by access control mechanisms. An authenticated user is granted access to system entities as permitted by a user profile associated with the user, regardless of the management protocol used and the inherent information model of that management protocol. Since access control is implemented as part of the management layer, access controls apply for authenticated users regardless of which management protocols the users use and, hence, regardless of the protocol-specific information model which applies.

The information models of the employed management protocols are tightly coupled to the internally used information model of the managed system (as specified in the management layer), while remaining loosely coupled in terms of implementation. This simplifies system growth such that, while a managed system may only initially support one management protocol, the managed system may be quickly and cost-effectively adapted to support multiple management protocols. Furthermore, in addition to supporting run-time operations described herein, the generation of protocol agents and the unified information model of the management layer may be performed in a manner which enables requirements tracing from requirements specifications (e.g., information model and protocol specifications), implementation, testing, and run-time operation.

Figure 8:
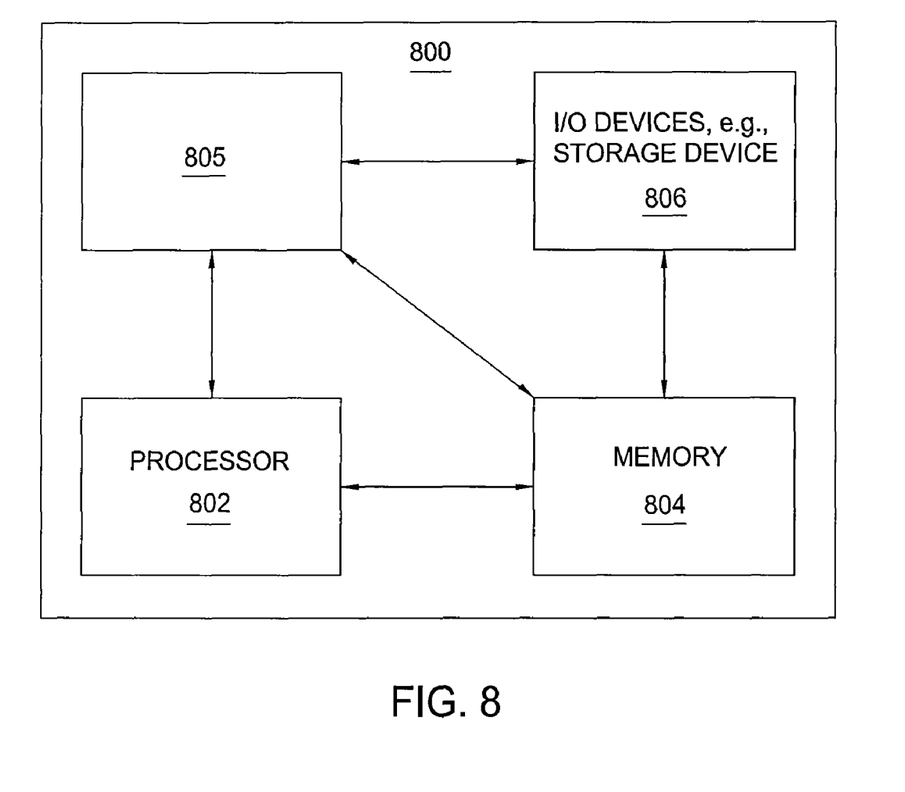
FIG. 8 depicts a high-level block diagram of a general-purpose computer suitable for use in performing at least a portion of the functions described herein.

FIG. 8 depicts a high-level block diagram of a general-purpose computer suitable for use in performing the functions described herein. As depicted in FIG. 8, system 800 comprises a processor element 802 (e.g., a CPU), a memory 804, e.g., random access memory (RAM) and/or read only memory (ROM), a protocol management module 805, and various input/output devices 806 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

The present invention may be implemented in software and/or in a combination of software and hardware, e.g., using application specific integrated circuits (ASIC), a general purpose computer or any other hardware equivalents. In one embodiment, the present protocol management module or process 805 can be loaded into memory 804 and executed by processor 802 to implement the functions as discussed above. Thus, protocol management process 805 (including associated data structures) of the present invention can be stored on a computer readable medium or carrier, e.g., RAM memory, magnetic or optical drive or diskette and the like.

Although depicted and described herein with respect to one protocol management module, the protocol management module is intended to be representative of various components of the present invention described herein. In one embodiment, for example, protocol management module 805 may include a management layer and associated protocol agents described herein. In one embodiment, for example, protocol management module 805 may include an information model converter and one or more protocol converters. In other words, although primarily depicted and described herein with respect to specific configurations of components, various components of the present invention may be implemented using fewer or more modules in various other configurations.

Although various embodiments which incorporate the teachings of the present invention have been shown and described in detail herein, those skilled in the art can readily devise many other varied embodiments that still incorporate these teachings.

What is claimed is:

1. A method for generating a protocol agent for a managed system, comprising:
    using a processor for:
        obtaining a protocol specification comprising a plurality of first mappings to an information model specification; and
        generating the protocol agent using the protocol specification, wherein the protocol agent comprises a plurality of second mappings to an implementation of a unified information model generated using the information model specification, wherein the second mappings are formed using the first mappings.

2. The method of claim 1, wherein the implementation of the unified information model is generated by processing the information model specification using an information model converter.

3. The method of claim 1, wherein generating the protocol agent comprises:
    selecting a protocol converter according to a protocol associated with the protocol specification; and
    processing the protocol specification using the selected protocol converter to form thereby the protocol agent.

4. The method of claim 1, wherein the protocol specification comprises a model of a protocol, wherein the implementation of the unified information model comprises a model of hardware of the managed system.

5. The method of claim 1, wherein the implementation of the unified information model comprises a plurality of logical entities, wherein the logical entities represent a plurality of physical entities of the managed system.

6. The method of claim 1, wherein the protocol agent comprises a plurality of protocol entities.

7. The method of claim 1, wherein the implementation of the unified information model comprises a plurality of logical entities, wherein the protocol agent comprises a plurality of protocol entities, wherein the second mappings comprise mappings between the logical entities and the protocol entities.

8. The method of claim 1, wherein the first mappings comprise reference mappings and the second mappings comprise use mappings.

9. The method of claim 1, further comprising:
    obtaining another protocol specification comprising another plurality of first mappings to the information model specification; and
    generating another protocol agent using the other protocol specification, wherein the other protocol agent comprises another plurality of second mappings to the implementation of the unified information model, wherein the other second mappings are formed using the other first mappings.

10. An apparatus for generating a protocol agent for a managed system, comprising:
    a processor configured for generating the protocol agent using a protocol specification, wherein the protocol specification comprises a plurality of first mappings to an information model specification, wherein the protocol agent comprises a plurality of second mappings to an implementation of a unified information model, wherein the implementation of the unified information model is generated using the information model specification, wherein the second mappings are formed using the first mappings.

11. The apparatus of claim 10, wherein the processor is configured for generating the implementation of the unified information model using the information model specification.

12. The apparatus of claim 10, wherein the protocol specification comprises a model of a protocol, wherein the information model specification comprises a model of hardware of the managed system.

13. The apparatus of claim 10, wherein the implementation of the unified information model comprises a plurality of logical entities, wherein the logical entities represent a plurality of physical entities of the managed system.

14. The apparatus of claim 10, wherein the protocol agent comprises a plurality of protocol entities.

15. The apparatus of claim 10, wherein the implementation of the unified information model comprises a plurality of logical entities, wherein the protocol agent comprises a plurality of protocol entities, wherein the second mappings comprise mappings between the logical entities and the protocol entities.

16. The apparatus of claim 10, wherein the first mappings comprise reference mappings and the second mappings comprise use mappings.

17. The apparatus of claim 10, wherein the processor is configured for generating another protocol agent using another protocol specification, wherein the other protocol specification comprises another plurality of first mappings to the information model specification, wherein the other protocol agent comprises another plurality of second mappings to the implementation of the unified information model, wherein the other second mappings are formed using the other first mappings.

18. A method for generating a protocol agent for a managed system, comprising:
   using a processor for:
      generating an implementation of a unified information model from an information model specification; and
      generating the protocol agent from a protocol specification;
      wherein the protocol specification comprises a plurality of first mappings to the information model specification, wherein the protocol agent comprises a plurality of second mappings to the implementation of the unified information model, wherein the second mappings are formed using the first mappings.

19. The method of claim 18, wherein generating the implementation of the unified information model comprises:
   obtaining the information model specification, wherein the information model specification comprises a model of hardware of the managed system; and
   generating the implementation of the unified information model by processing the information model specification using an information model converter, wherein the implementation of the unified information model comprises a plurality of logical entities, wherein the logical entities represent a plurality of physical entities of the managed system.

20. The method of claim 18, wherein generating the protocol agent comprises:
   obtaining the protocol specification, wherein the protocol specification comprises a model of a protocol; and
   generating the protocol agent by processing the protocol specification using a protocol converter, wherein the protocol agent comprises a plurality of protocol entities.

* * * * *